(12) United States Patent
Greenshpan et al.

(10) Patent No.: US 8,356,057 B2
(45) Date of Patent: Jan. 15, 2013

(54) CROWD-SOURCING FOR GAP FILLING IN SOCIAL NETWORKS

(75) Inventors: Ohad Greenshpan, Raanana (IL); Ido Guy, Haifa (IL); Michal Jacovi, Rakefet (IL); Itai Turbahn, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 12/794,791

(22) Filed: Jun. 7, 2010

(65) Prior Publication Data
US 2011/0302174 A1 Dec. 8, 2011

(51) Int. Cl.
*G06F 17/30* (2006.01)
*G06F 7/00* (2006.01)

(52) U.S. Cl. ......................... 707/794; 707/758
(58) Field of Classification Search .................. 707/794, 707/758
See application file for complete search history.

(56) References Cited

U.S. PATENT DOCUMENTS

| 2007/0043688 A1 | 2/2007 | Kountz et al. | |
|---|---|---|---|
| 2009/0187473 A1* | 7/2009 | Blaze et al. | 705/10 |
| 2009/0187569 A1 | 7/2009 | Lubarski et al. | |

OTHER PUBLICATIONS

Bernstein et al.: "Collabio: A Game for Annotating People within Social Networks", UIST'09, Oct. 4-7, 2008, Victoria, BC, Canada.*

Luis von Ahn and Laura Dabbish, "Labeling Images with a Computer Game", 2004. URL: http://www.cs.cmu.edu/~biglou/ESP.pdf.

Stephen Farrell, Tessa Lau, "Fringe Contacts: People-Tagging for the Enterprise", IBM research division, San-Josa, 2006. URL: http://domino.watson.ibm.com/library/CyberDig.nsf/papers/53299B30AD986C78852571B0004F46A9/$File/rj10384.pdf.

Tagalag "Manage your identity", URL: http://tagalag.com/.

Maryam Najafian Razavi and Lee Iverson, "Supporting Selective Information Sharing with People-tagging", Apr. 5-10, 2008, Florence, Italy. URL: http://portal.acm.org/citation.cfm?id=1358628.1358868.

Michael Bernstein et al., "Collabio: A Game for Annotating People within Social Networks", Oct. 2008. URL: http://research.microsoft.com/en-us/um/people/horvitz/collabio.pdf.

Stephen Farrell et al., "Building Communities with People-Tags", Lecture Notes in Computer Science, vol. 4663/2009, Human-Computer Interaction—INTERACT 2007, pp. 357-360.

* cited by examiner

*Primary Examiner* — Kuen Lu (57) ABSTRACT

A method, system, and computer program product for gap filling in a social network are provided. The method includes providing details of one or more current online users in a game in which users are scored for their input. A person is selected from candidates for whom additional information is required in a social network, including: weighting candidates who have a strong relationship with a current online user in the game; and weighting candidates for whom there is little existing data in the social network. The method includes identifying the selected person to a current online user; receiving information input by a current online user relating to the selected person; and scoring the information input by a current online user.

19 Claims, 7 Drawing Sheets

CROWD-SOURCING FOR GAP FILLING IN SOCIAL NETWORKS

BACKGROUND

This invention relates to the field of social network data. In particular, the invention relates to crowd-sourcing for gap filling in social networks.

Crowd-sourcing using games has developed as a way to use a large group of people or community to perform a task. Mass collaboration enabled by Web 2.0 technologies can be leveraged to achieve business goals.

The ESP Game is an interactive game that harnesses the crowd for improving the quality and quantity of metadata on Google's (Google is a Trade Mark of Google, Inc.) indexed images, by introducing an online tagging game for people. The idea behind the game is to use the computational power of humans to perform a task that computers cannot yet do (originally, image recognition) by packaging the task as a game. The ESP game has proved to be an effective mechanism to cover a major part of Google's indexed images, in a relative short time period.

Online social network services (SNSs) are playing an ever-important role in shaping the behavior of users on the web. Popular social sites (such as Facebook (Facebook is a Trade Mark of Facebook, Inc.), MySpace (MySpace is a Trade Mark of News Corporation), Flickr, and del.icio.us (Flickr and del.icio.us are Trade Marks of Yahoo!, Inc.)) are enjoying increasing traffic and are turning into community spaces, where users interact with their friends and acquaintances.

Social network participants often use tagging as a light-weight and flexible approach to classifying information. Tagging enables individuals to use whatever terms they think are appropriate to describe or help them recall a resource without the burden of selecting a category from a known taxonomy. Members of social networks do not only tag items or entities, but also tag people and by that link them to items or entities in the social network. The concept of people-tagging has been presented for various applications, such as augmentation of employee directories, self-promotion and finding colleagues and friends with similar interests, and relationship management for access control.

Collabio (Collabio is a Trade Mark of Microsoft Corporation) presented a social tagging game within an online social network that encourages friends to add tags on one another.

BRIEF SUMMARY

According to a first aspect of the present invention there is provided a method for gap filling in a social network, comprising: providing details of one or more current online users in a game in which users are scored for their input; selecting a person from candidates for whom additional information is required in a social network, including: weighting candidates who have a strong relationship with a current online user in the game; and weighting candidates for whom there is little existing data in the social network; identifying the selected person to a current online user; receiving information input by a current online user relating to the selected person; and scoring the information input by a current online user; wherein said steps are implemented in either: computer hardware configured to perform said identifying, tracing, and providing steps, or computer software embodied in a non-transitory, tangible, computer-readable storage medium.

According to a second aspect of the present invention there is provided a computer program product for aggregation of social network data, the computer program product comprising: a computer readable storage medium having computer readable program code embodied therewith, the computer readable program code comprising: computer readable program code configured to: provide details of one or more current online users in a game in which users are scored for their input; select a person from candidates for whom additional information is required in a social network, including: weighting candidates who have a strong relationship with a current online user in the game; and weighting candidates for whom there is little existing data in the social network; identify the selected person to a current online user; receive information input by a current online user relating to the selected person; and score the information input by a current online user.

According to a third aspect of the present invention there is provided a system for gap filling in a social network, comprising: processor; an online game mechanism with one or more current online users in which users are scored for their input; a person selection component for selecting a person from candidates for whom additional information is required in a social network, including: weighting candidates who have a strong relationship with a current online user in the game; and weighting candidates for whom there is little existing data in the social network; wherein the online game mechanism includes: an information gathering component for receiving information input by a current online user relating to the selected person; and a scoring component for scoring the information input by a current online user.

According to a fourth aspect of the present invention there is provided a method for providing a service to a customer over a network for gap filling in a social network, the service comprising: providing details of one or more current online users in a game in which users are scored for their input; selecting a person from candidates for whom additional information is required in a social network, including: weighting candidates who have a strong relationship with a current online user in the game; and weighting candidates for whom there is little existing data in the social network; identifying the selected person to a current online user; receiving information input by a current online user relating to the selected person; and scoring the information input by a current online user; wherein said steps are implemented in either: computer hardware configured to perform said identifying, tracing, and providing steps, or computer software embodied in a non-transitory, tangible, computer-readable storage medium.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

A method, system and computer program product are described in which crowd-sourcing is used for gap filling in social networks. A mechanism is described to harness people to add information about relationships between people, and between people and other entities in the network. These people can exist in the social network, and therefore the information existing about them would be enriched, or can be introduced to the social network, in case they are hardly active in the social network, or inactive at all.

A gaming mechanism is described to fill in gaps of social networks, for information on people and their relationships to other people and to other entities in the network. A selection function is described that encourages contribution of information on people with minimal existing information and a strong relationship with the contributor. A scoring function is described that encourages rare evidence but validated evidence.

The described solution enriches the information on existing entities in social networks, but also helps to make social networks grow to contain information on new entities that did not exist in the network, and is therefore complementary to existing social networking methods. The information contributed by an online user is added to the social network data to build a social graph of relationships between people.

Figure 1:
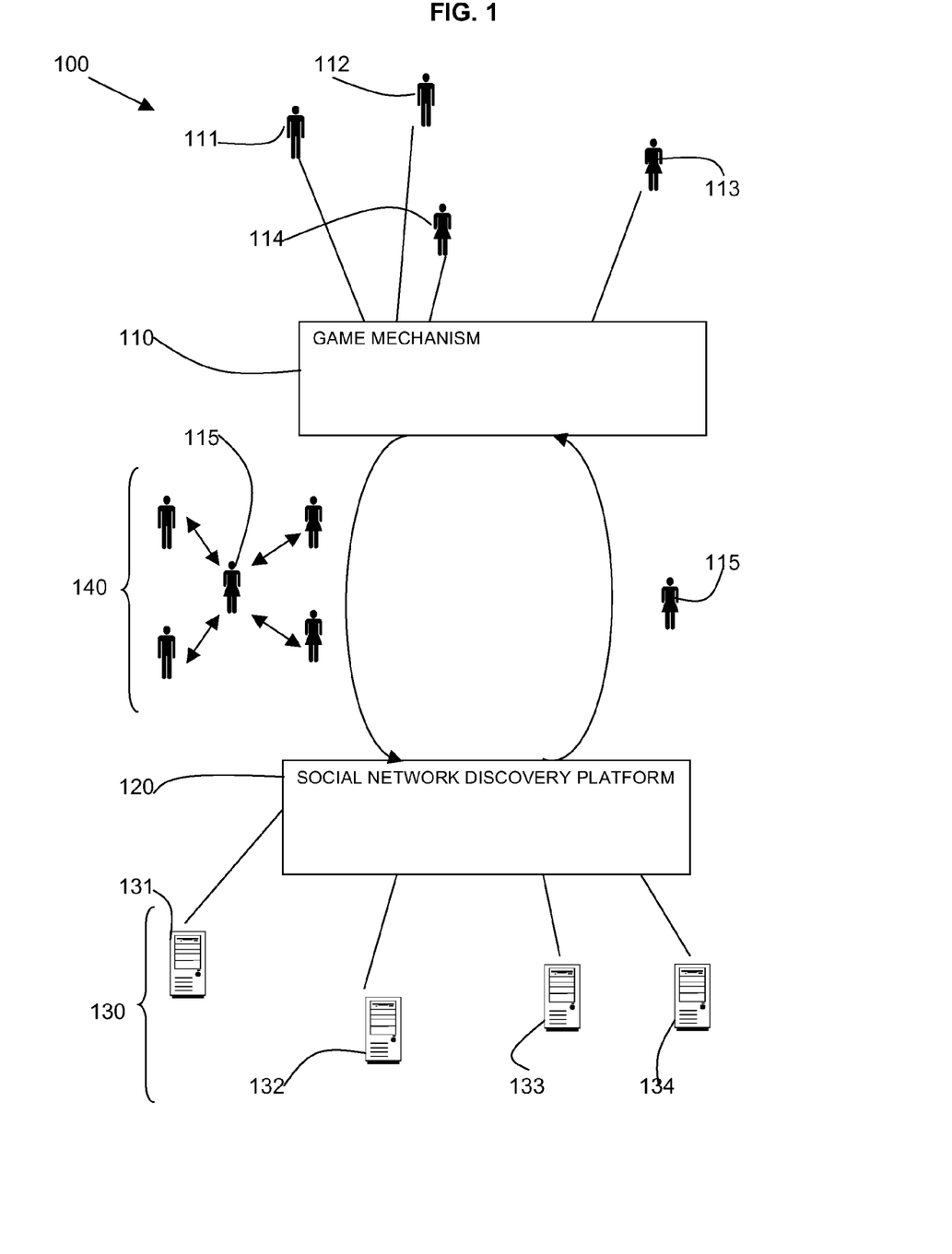
FIG. 1 is a schematic diagram illustrating a system in accordance with the present invention.

Referring to FIG. 1, a schematic diagram shows an example embodiment of a system 100 with a gap filling game mechanism 110, which harnesses information from the game players 111-114.

A social network discovery platform 120 interacts with the gap filling game mechanism 110 to provide a selected person 115 on whom information is needed and to gather harnessed information 140 on the selected user 115 from the game players 111-114. The gathered information 140 is used to improve and fill gaps in a social network 130 of users 131-134.

Although the gap filling game mechanism 110 and the social network discovery platform 120 are shown separately they may be provided as a single component.

Figure 2:
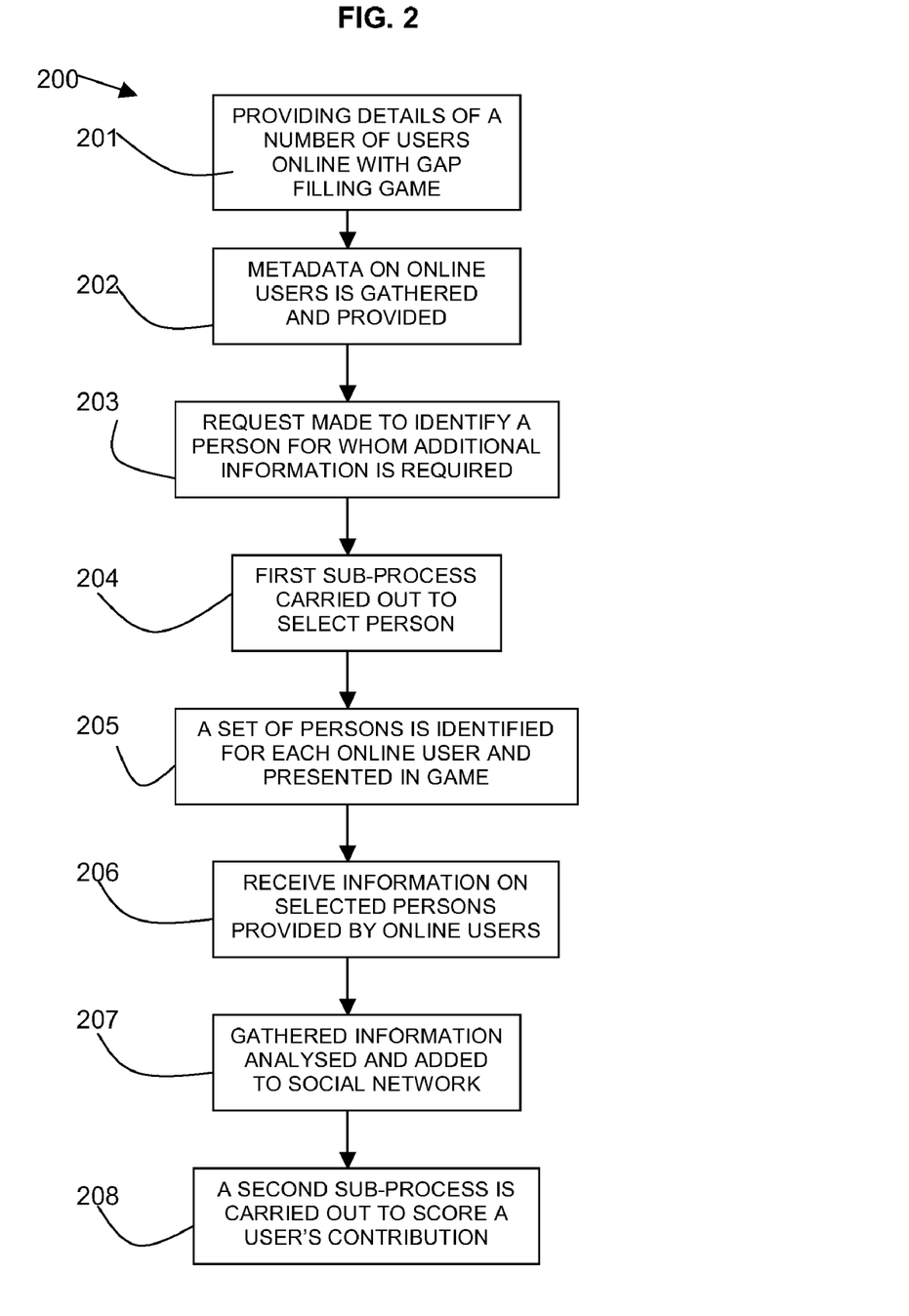
FIG. 2 is a flow diagram of a method in accordance with the present invention.

Referring to FIG. 2, a flow diagram 200 shows an overall method of gap filling in a social network using crowd-sourcing.

Details are provided of a number of users online 201 with a gap filling game. Metadata containing user general information (e.g., user ID, full name, currently known relationship to other entities in the social network) and information relevant for the game (e.g., number of scores, rank) on the online users is gathered and provided 202. A request is made 203 to identify persons for whom additional information is required. The request indicates the IDs of the users who are online and their metadata.

A first sub-process is carried out 204 to select a person for whom additional information is required. The sub-process is iterated to obtain a set of selected persons for each online user. The sub-process encourages contribution of information on people with minimal existing information and a strong relationship with the current users online. The sub-process may be carried out by a gap filling game system or by a separate entity such as a social network discovery platform as shown in FIG. 1.

A set of persons is identified for each online user and presented 205 to the online user in the gap filling game. Information on the selected persons in the game is received 206 as provided by the online users. The information may be in response to questions by the gap filling game. The information may relate to information on relationships of the selected person with other people and entities.

The gathered information is analysed 207 and added to social network data.

A second sub-process is carried out 208 to score a user's contribution. The sub-process encourages rare evidence but validated evidence.

Figure 3:
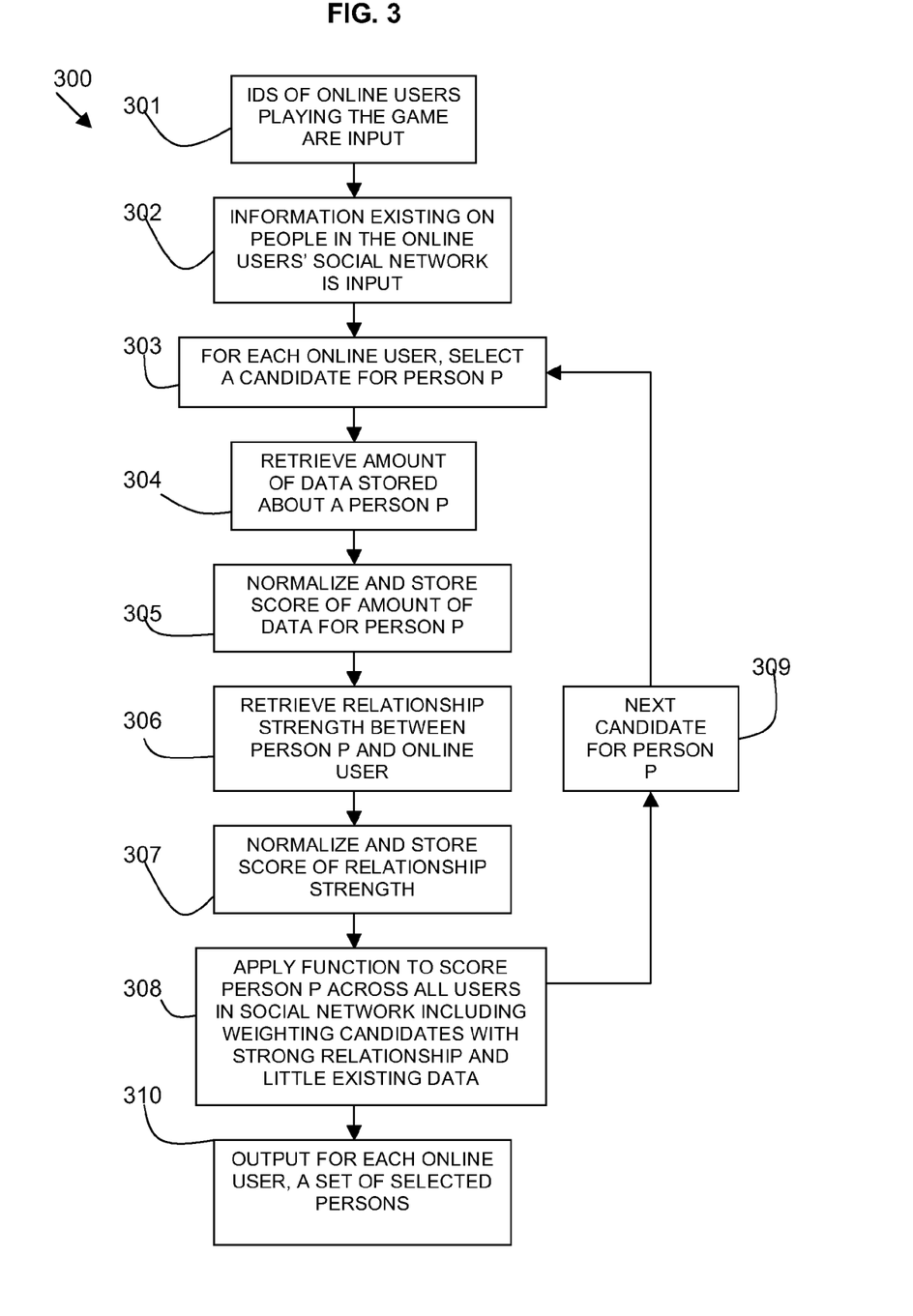
FIG. 3 is a flow diagram of a method in accordance with an aspect of the present invention.

Referring to FIG. 3, a flow diagram 300 shows an example embodiment of the first sub-process 204 of FIG. 2, of selecting a person from candidates for whom additional information is required in a social network.

Another method for selecting a person would be to prioritize higher people with the highest connectivity to all users playing online (to encourage competition throughout the game).

The IDs of online users playing the game who are involved with a request for a person are input 301. Information existing on people in the online users' social network is also input 302 as gathered from the social network. A function F aims to maximize information about people in the online users' social network.

For each online user (referred to as the current player P'), a candidate for selected person P is selected 303.

Let $F_{data}$ be a function that retrieves 304 the amount of data being stored in the system about a person P. The amount of data can be measured, for example, as the number of documents being associated with person P. The function values for $F_{data}$ may be normalized between 0 to 1 (0 stands for no items, and 1 stands for the maximum number of items) and the score stored 305.

Let $F_{rel}$ be the function that retrieves 306 the relationship strength between person P and the current player P'. The values of $F_{rel}$ may also be normalized between 0 to 1 (0 stands for weak relationship, and 1 for strong relationship) and the score stored 307.

In this example embodiment, function F is applied 308 to gives high scores for people on which there is a gap in information and with which a player is familiar, thus being defined as the following: $F=(1-F_{data})+F_{rel}$, for all users in the social network. The function 308 weights candidates who have a strong relationship with a current online user in the game and weights candidates for whom there is little existing data in the social network;

By looking for people with high F values, the system will encourage contribution of information on people with minimal information (low $F_{data}$ values) and strong relationship with the player (high $F_{rel}$ values).

A next candidate for person P is selected 309 and the process iterated. Output 310 for each online user, a set of selected persons he is playing on. Each online user gets his own set of selected persons from the social network.

Figure 4:
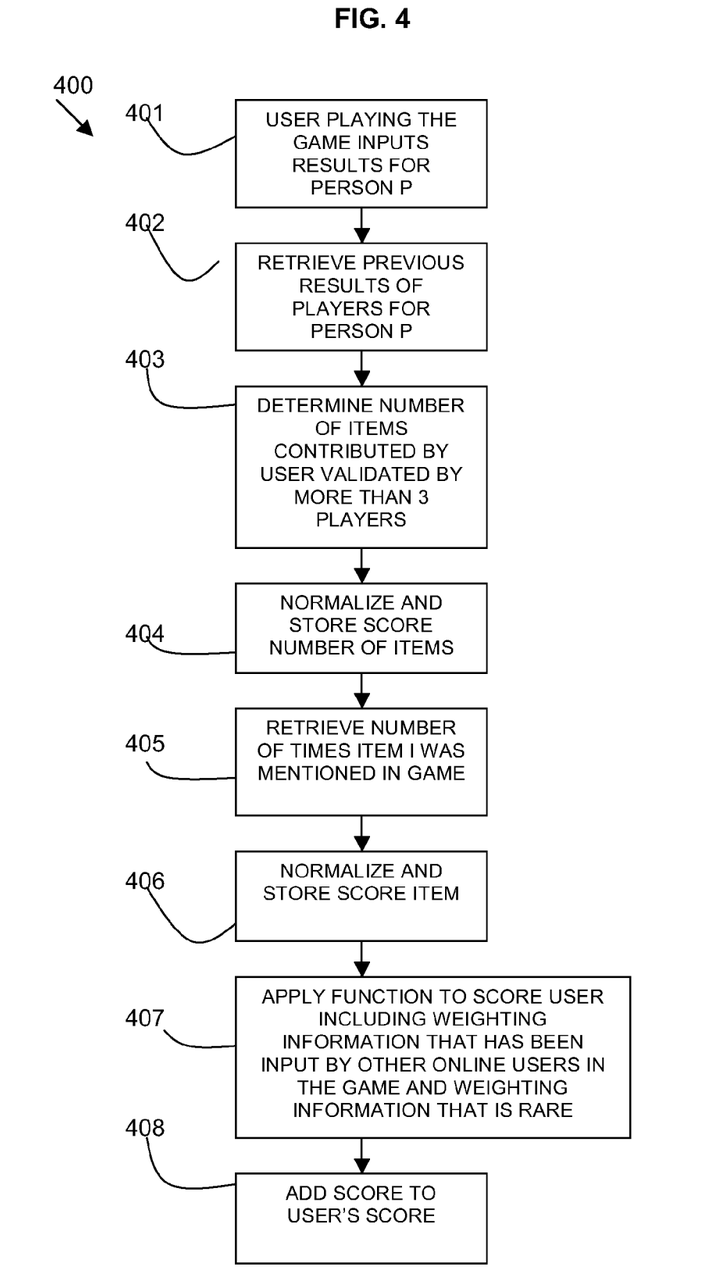
FIG. 4 is a flow diagram of a method in accordance with another aspect of the present invention.

Referring to FIG. 4, a flow diagram 400 shows an example embodiment of the second sub-process 208 of FIG. 2, of scoring a user's input. The scoring function S, that determines the score for the submitted results, relies on the following: (1) Trust of the players contributing the information; and (2) Prior evidence to the facts being submitted by the players. The scoring function aims at maximizing the number of trustworthy (or validated) facts being submitted.

Another scoring function could take into account temporal considerations, and score higher facts that are said successively, or alternatively encourage introduction of items that have not been said in a while.

A user playing the game, inputs 401 results for a person P. The results could be input in response to questions put to the user, or as tags on the person P.

The previous results input by other players are retrieved 402. Let $S_{val}$ be the function that determines 403 the number of items being contributed by player P that were validated by more than 3 people. The values of $S_{val}$ can be normalized between 0 to 1 (0 stands for no items, 1 stands for the maximum number of items) and the score stored 404.

Let $S_{rare}$ be the function that retrieves 405 the number of times an item I was mentioned in the game. The values of $S_{rare}$ can be normalized between 0 to 1 (0 stands for no such occurrences, 1 stands for the maximum number of occurrences) and the score stored 406.

In this example embodiment, function S is applied 407 to give high scores to people who gave trustworthy answers and provided rare items, thus it may be defined as: $S=S_{val}+(1-S_{rare})$ across all items mentioned by the user. The function 407 weights information that has been input by other online users in the game and weights information that is rare. The score is added 408 to the player's score.

Figure 5:
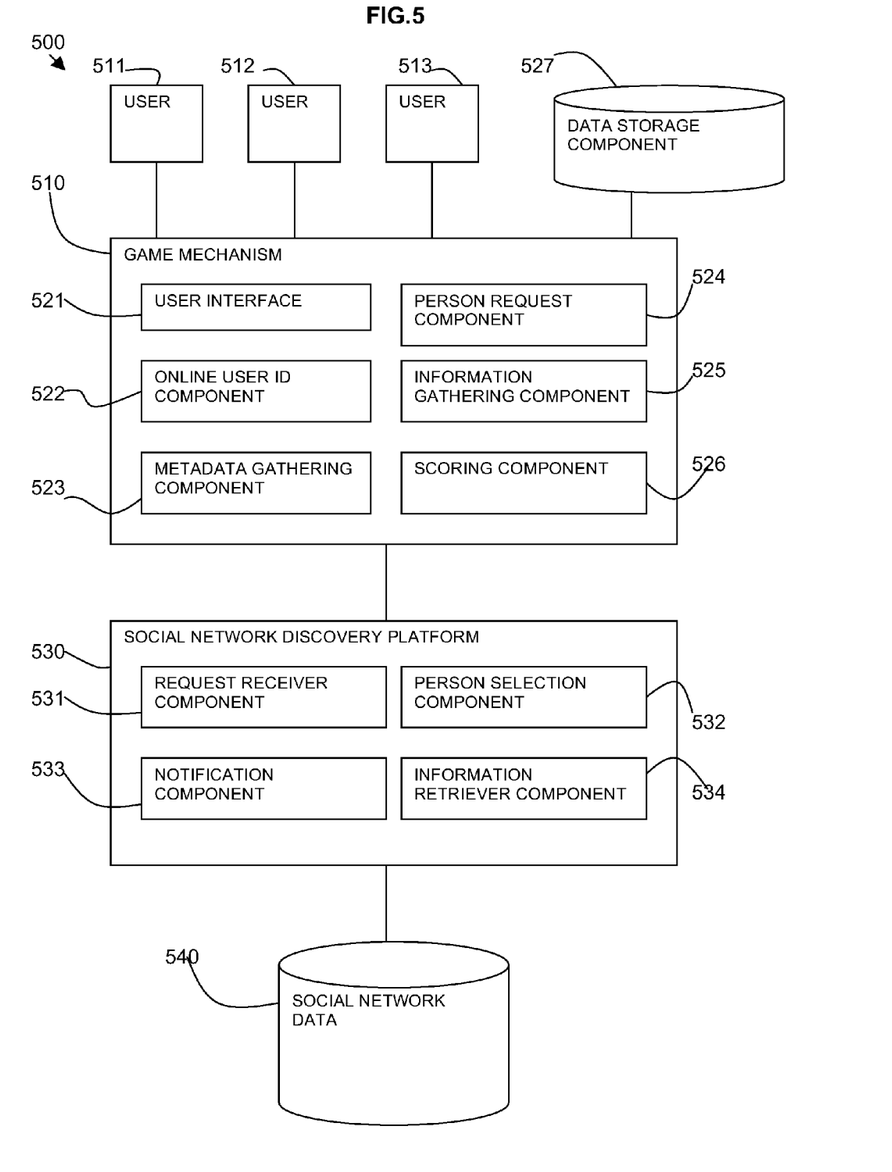
FIG. 5 is a block diagram of a system in accordance with the present invention.

Referring to FIG. 5, an embodiment of a system 500 for crowd-sourcing for gap filling in social networks is shown. In this embodiment, there is a gap filling game mechanism 510 with which multiple users 511-513. At any given time, a number of the users 511-513 may be online with the gap filling game mechanism 510 in order to play the game.

The gap filling game mechanism 510 includes a user interface 521 for users 511-513 to interact with the game mechanism 510. The game mechanism 510 includes a online users' ID component 522 to identify the current online users and a metadata gathering component 523 for gathering metadata relating to the online users 511-513.

The game mechanism 510 includes a person request component 524 for requesting a person to be selected to be the subject of the game. The game mechanism 510 further includes an information gathering component 525 for gathering information on the selected person from the online users 511-513. The information includes connections of the selected person. A scoring component 526 scores the information input by an online user 511-513 using a defined algorithm.

The game mechanism 510 includes or has access to a data storage component 527 for storing information input by online users 511-513 in the game, which may be used by the scoring component 526.

A social network discovery platform 530 is provided which collects, maintains and mines information about people in social networks. The discovery platform 530 has access to social network data 540. The discovery platform 530 includes a request receiver component 531 to select a person on which information is required. A request contains metadata about the players playing online.

A person selection component 532 uses information received by the request receiver component 531 and social network data 540 to select a person using a defined algorithm. A notification component 533 notifies the game mechanism 510 of the selected person.

An information receiver component 534 receives additional social network data derived from the information input by online users 511-513 in the game and adds this to the existing social network data 540.

Figure 6:
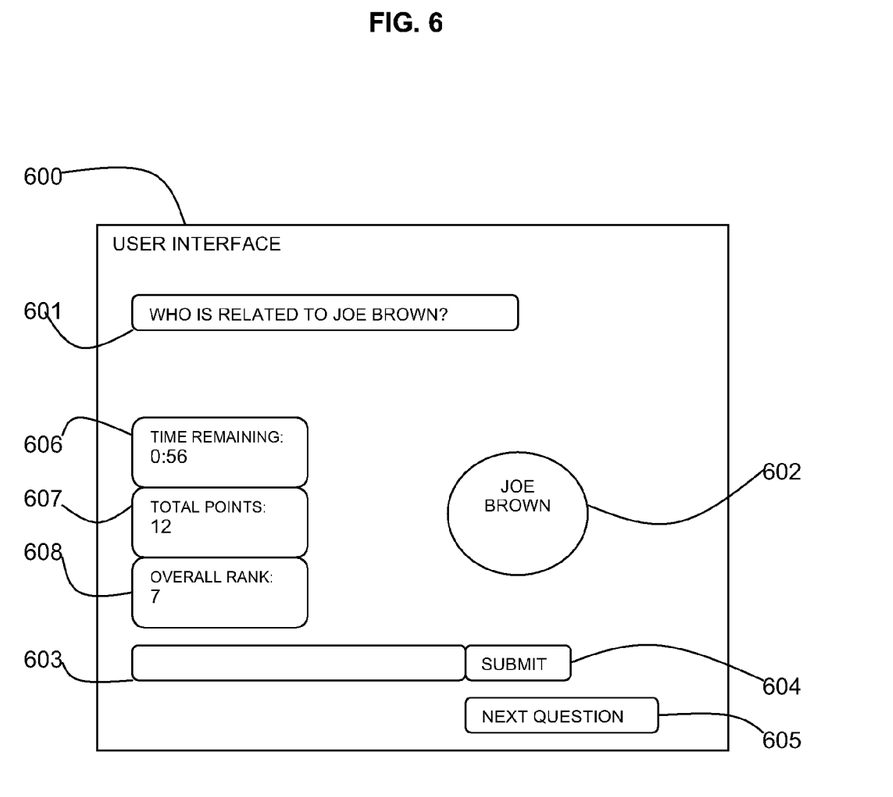
FIG. 6 is a diagram representing a user interface in accordance with the present invention.

Referring to FIG. 6, a screenshot is shown of an example user interface 600 of the game mechanism, as being seen by each player.

In the example user interface 600, a question 601 is posed to the player regarding a selected person 602. An input field 603 is provided for the player to input his answer, with a "submit" button 604 to submit the answer. A "next question" button 605 is provided to advance the game by forcing the system to provide the next question related to the selected person 602 or to the next selected person.

A time field 606 is provided to give a predefined time limit to the player in which he can submit his answer. A points field 607 indicates the point scored by the player, and a ranking field 608 indicates the player's ranking compared to other players.

Figure 7:
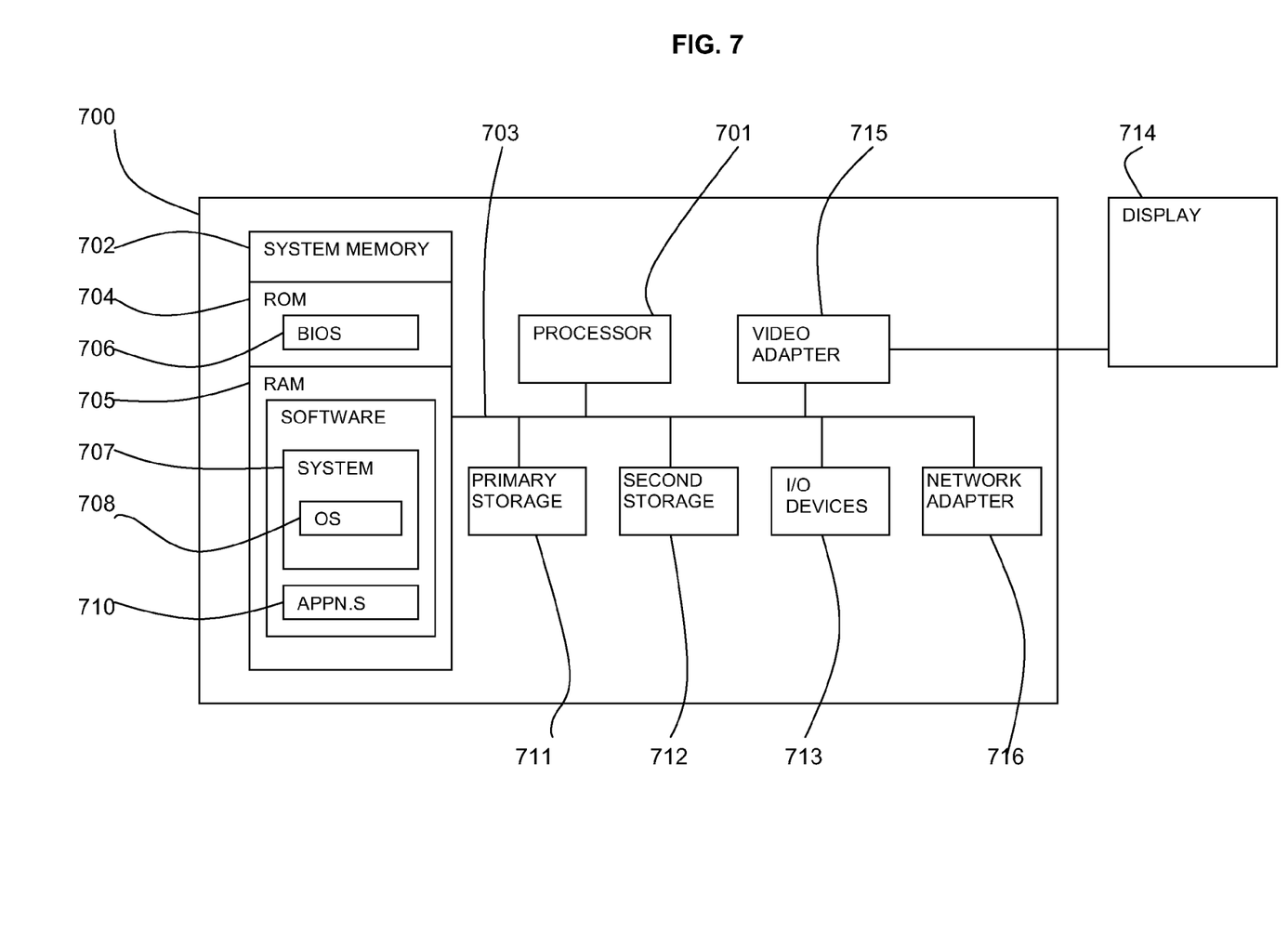
FIG. 7 is a block diagram of a computer system in which the present invention may be implemented.

Referring to FIG. 7, an exemplary system for implementing aspects of the invention includes a data processing system 700 suitable for storing and/or executing program code including at least one processor 701 coupled directly or indirectly to memory elements through a bus system 703. The memory elements can include local memory employed during actual execution of the program code, bulk storage, and cache memories which provide temporary storage of at least some program code in order to reduce the number of times code must be retrieved from bulk storage during execution.

The memory elements may include system memory 702 in the form of read only memory (ROM) 704 and random access memory (RAM) 705. A basic input/output system (BIOS) 706 may be stored in ROM 704. System software 707 may be stored in RAM 705 including operating system software 708. Software applications 710 may also be stored in RAM 705.

The system 700 may also include a primary storage means 711 such as a magnetic hard disk drive and secondary storage means 712 such as a magnetic disc drive and an optical disc drive. The drives and their associated computer-readable media provide non-volatile storage of computer-executable instructions, data structures, program modules and other data for the system 700. Software applications may be stored on the primary and secondary storage means 711, 712 as well as the system memory 702.

The computing system 700 may operate in a networked environment using logical connections to one or more remote computers via a network adapter 716.

Input/output devices 713 can be coupled to the system either directly or through intervening I/O controllers. A user may enter commands and information into the system 700 through input devices such as a keyboard, pointing device, or other input devices (for example, microphone, joy stick, game pad, satellite dish, scanner, or the like). Output devices may include speakers, printers, etc. A display device 714 is also connected to system bus 703 via an interface, such as video adapter 715.

A gap filling game mechanism may be provided as a service to users over a network.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for information gap filling, comprising the steps of:
collecting respective amounts of details concerning members of a set of persons in a social network, wherein additional details are desired regarding the members of the set of persons;
identifying online participants in a gap-filling game;
defining for the online participants respective sets of candidates, the sets of candidates being subsets of the set of persons, wherein defining comprises computing a candidate score for each member of the set of persons, the candidate score being computed as an increasing function of a relationship strength between the member of the set of persons and the online participants, respectively and a decreasing function of the collected amount of details of the member of the set of persons;
presenting the sets of candidates to other online participants, respectively;
receiving information items regarding members of the presented sets of candidates from the other online participants, respectively, the information items comprising relationships between the candidates and other entities in the social network; and
evaluating the online participants by identifying respective validated information items that are contributed by the online participants, the validated information items being identified with a predefined number of corresponding information items that are contributed by the other online participants; and
computing a participant score, wherein the participant score increases according to a number of the validated information items, and for each of the validated information items, the participant score decreases according to a total number of occurrences of the corresponding information items.

2. The method according to claim 1, wherein the online participants are users of the social network.

3. The method according to claim 1, wherein the candidate score of one of the members of the set of persons is computed as a function $F=(1-F_{data})+F_{rel}$, wherein
$F_{rel}$ is a first function that retrieves the relationship strength between the one member of the set of persons and one of the online participants; and
Fdata is a second function that retrieves the collected amount of data concerning the one member of the set of persons.

4. The method according to claim 3, wherein the first function and the second function are normalized functions having values ranging from 0 to 1.

5. The method according to claim 1, wherein computing a participant score of one of the online participants comprises computing a function $S=S_{val}+(1-S_{rare})$, which is accumulated for all the information items contributed by the one online participant, wherein
$S_{val}$ is a first function, that determines a number of the information items that were contributed by the one online participant and which were validated by more than three other online participants; and
$S_{rare}$ is a second function that retrieves a total number of times that one of the information items was mentioned by the online participants.

6. The method according to claim 5, wherein the first function and the second function are normalized functions having values ranging from 0 to 1.

7. The method according to claim 1, wherein computing a participant score comprises increasing the participant score when successively stated instances of one of the information items are identified.

8. The method according to claim 1, wherein computing a participant score comprises increasing the participant score when a predefined time interval has elapsed between a reception of one of the information items and a previous reception of the one information item.

9. The method according to claim 1, further comprising adding the information items to social network data to build a social graph of relationships among users of the social network.

10. A computer software product for information gap filling, including a non-transitory computer-readable storage medium in which computer program instructions are stored, which instructions, when executed by a computer, cause the computer to perform the steps of:
collecting respective amounts of details concerning members of a set of persons in a social network, wherein additional details are desired regarding the members of the set of persons;
identifying online participants in a gap-filling game;
defining for the online participants respective sets of candidates, the sets of candidates being subsets of the set of persons, wherein defining comprises computing a candidate score for each member of the set of persons, the candidate score being computed as an increasing function of a relationship strength between the member of the set of persons and the online participants, respectively and a decreasing function of the collected amount of details of the member of the set of persons;
presenting the sets of candidates to other online participants, respectively;
receiving information items regarding members of the presented sets of candidates from the other online participants, respectively, the information items comprising relationships between the candidates and other entities in the social network; and
evaluating the online participants by identifying respective validated information items that are contributed by the online participants, the validated information items being identified with a predefined number of corresponding information items that are contributed by the other online participants; and
computing a participant score, wherein the participant score increases according to a number of the validated information items, and for each of the validated information items, the participant score decreases according to a total number of occurrences of the corresponding information items.

11. The computer software product according to claim 10, wherein the candidate score of one of the members of the set of persons is computed as a function $F=(1-F_{data})+F_{rel}$, wherein
$F_{rel}$ is a first function that retrieves the relationship strength between the one member of the set of persons and one of the online participants; and Fdata is a second function that retrieves the collected amount of data concerning the one member of the set of persons.

12. The computer software product according to claim 10, wherein computing a participant score of one of the online participants comprises computing a function $S=S_{val}+(1-S_{rare})$, which is accumulated for all the information items contributed by the one online participant, wherein $S_{val}$ is a first function, that determines a number of the information items that were contributed by the one online participant and which were validated by more than three other online participants; and $S_{rare}$ is a second function that retrieves a total number of times that one of the information items was mentioned by the online participants.

13. The computer software product according to claim 10, wherein computing a participant score comprises increasing the participant score when successively stated instances of one of the information items are identified.

14. The computer software product according to claim 10, wherein computing a participant score comprises increasing the participant score when a predefined time interval has elapsed between a reception of one of the information items and a previous reception of the one information item.

15. The computer software product according to claim 10, further comprising adding the information items to social network data to build a social graph of relationships among users of the social network.

16. A data processing system for information gap filling, comprising:
    a processor;
    a memory accessible to the processor storing programs and data objects therein, the programs including a metadata gathering component, an online user identification component, a person request component, a user interface, an information gathering component, and a scoring component, wherein execution of the programs cause the processor to perform the steps of:
    invoking the metadata gathering component for collecting respective amounts of details concerning members of a set of persons in a social network, wherein additional details are desired regarding the members of the set of persons;
    with the online user identification component identifying online participants in a gap-filling game;
    using the person request component, defining for the online participants respective sets of candidates, the sets of candidates being subsets of the set of persons, wherein defining comprises computing a candidate score for each member of the set of persons, the candidate score being computed as an increasing function of a relationship strength between the member of the set of persons and the online participants, respectively and a decreasing function of the collected amount of details of the member of the set of persons;
    presenting the sets of candidates via the user interface to other online participants, respectively;
    receiving in the information gathering component information items regarding members of the presented sets of candidates from the other online participants, respectively, the information items comprising relationships between the candidates and other entities in the social network; and
    evaluating the online participants using the scoring component by identifying respective validated information items that are contributed by the online participants, the validated information items being identified with a predefined number of corresponding information items that are contributed by the other online participants; and
    computing a participant score, wherein the participant score increases according to a number of the validated information items, and for each of the validated information items, the participant score decreases according to a total number of occurrences of the corresponding information items.

17. The data processing system according to claim 16, wherein the candidate score of one of the members of the set of persons is computed as a function $F=(1-F_{data})+F_{rel}$, wherein $F_{rel}$ is a first function that retrieves the relationship strength between the one member of the set of persons and one of the online participants; and Fdata is a second function that retrieves the collected amount of data concerning the one member of the set of persons.

18. The data processing system according to claim 16, wherein computing a participant score of one of the online participants comprises computing a function $S=S_{val}+(1-S_{rare})$, which is accumulated for all the information items contributed by the one online participant, wherein $S_{val}$ is a first function, that determines a number of the information items that were contributed by the one online participant and which were validated by more than three other online participants; and $S_{rare}$ is a second function that retrieves a total number of times that one of the information items was mentioned by the online participants.

19. The data processing system according to claim 16, further comprising a data store containing social network data, wherein the processor is operative for adding the information items to the social network data to build a social graph of relationships among users of the social network.

* * * * *